United States Patent
Peterson et al.

(10) Patent No.: US 9,347,607 B2
(45) Date of Patent: May 24, 2016

(54) SEED PROCESSING DEVICE

(71) Applicant: All Star Manufacturing & Design, LLC, Orem, UT (US)

(72) Inventors: Allen Peterson, Orem, UT (US); Matt Davis, Orem, UT (US); Robert Bingel, Orem, UT (US)

(73) Assignee: All Star Manufacturing & Design, LLC, Orem, UT (US)

( * ) Notice: Subject to any disclaimer, the term of this patent is extended or adjusted under 35 U.S.C. 154(b) by 0 days.

(21) Appl. No.: 14/092,303

(22) Filed: Nov. 27, 2013

(65) Prior Publication Data

US 2015/0151331 A1    Jun. 4, 2015

(51) Int. Cl.
*F16M 13/02* (2006.01)
*B07B 1/15* (2006.01)
*B07B 1/46* (2006.01)

(52) U.S. Cl.
CPC ............. *F16M 13/02* (2013.01); *B07B 1/15* (2013.01); *B07B 1/155* (2013.01); *B07B 1/4636* (2013.01)

(58) Field of Classification Search
CPC .................................. B07B 1/14; B07B 1/46
USPC ................ 209/663, 667, 671, 673; 248/205.1
See application file for complete search history.

(56) References Cited

U.S. PATENT DOCUMENTS

| | | | | |
|---|---|---|---|---|
| 2,752,967 A | * | 7/1956 | Sylvain | B07B 13/00 83/107 |
| 2,956,601 A | * | 10/1960 | Fry | A01C 1/005 83/408 |
| 3,096,801 A | * | 7/1963 | Miles | A01C 1/005 47/89 |
| 3,291,176 A | * | 12/1966 | Peterson | A01C 1/005 83/420 |
| 3,688,828 A | * | 9/1972 | Peterson | A01C 1/005 83/155 |
| 4,405,050 A | * | 9/1983 | Fenton, Jr. | B07B 13/18 198/782 |
| 4,583,644 A | * | 4/1986 | Niemann | B07B 13/04 198/839 |
| 6,321,484 B1 | | 11/2001 | Zelinski, Jr. et al. | |
| 7,000,513 B2 | | 2/2006 | Zelinski, Jr. et al. | |
| 7,849,771 B2 | | 12/2010 | Julian et al. | |

FOREIGN PATENT DOCUMENTS

| | | | | |
|---|---|---|---|---|
| CN | 201493245 | * | 6/2010 | B07B 1/14 209/671 |
| CN | 102771549 | * | 11/2012 | A23B 7/00 209/671 |

\* cited by examiner

*Primary Examiner* — Terrell Matthews
(74) *Attorney, Agent, or Firm* — Thorpe North & Western, LLP

(57) ABSTRACT

A sorting and sizing machine is disclosed having a frame comprising laterally spaced opposing guide rails. A plurality of sizing members are disposed between a top and bottom of each opposing guide rail. Within the opposing guide rails, individual members of a plurality of sizing brackets are disposed between individual members of a plurality of sizing spring members. A plurality of sizing rollers are disposed between opposing guide rails. Each of the sizing rollers is rotatably coupled to and disposed between an opposing pair of sizing brackets.

13 Claims, 11 Drawing Sheets

SEED PROCESSING DEVICE

FIELD OF THE INVENTION

The present invention relates to food processing machines and more particularly to an improved device for sorting and sizing potato seeds.

BACKGROUND OF THE INVENTION

It is known to cut and size seed potatoes in a variety of ways prior to planting. In the past, seed potatoes have often been cut by hand with a common knife prior to planting. In the more recent past, large automatic seed cutters which use a blade to cut potatoes have gained in popularity. Examples of prior art automated seed potato cutters are described in U.S. Pat. Nos. 3,291,176, 3,096,801, and 3,688,828. It is important that the cut portions of seed potatoes utilized for planting purposes be substantially uniform in size. Due to the different sizes of seed potatoes that may be encountered, it is necessary to accurately sort potatoes by their size prior to cutting to optimize uniformity of seedlings. The manufacture and maintenance on existing seed cutters, however, is labor-intensive. Time when a machine is not operational during a harvest is extremely costly for the user. A need exists, therefore, for improved systems and methods for sorting and sizing potatoes with more efficient means of operation, manufacture, and maintenance while maintaining appropriate sorting and sizing functions.

SUMMARY OF THE INVENTION

The above-referenced need is satisfied with a potato seed sizing machine in accordance with embodiments of the present invention. In accordance with one embodiment, an opposing pair of guide rails is provided wherein each guide rail comprises an area defined by the vertical plane associated with vertical side walls of top and bottom guide rails. A plurality of sizing brackets are disposed about the guide rails and a plurality of sizing rollers are disposed between the opposing pair of guide rails. Each of the sizing rollers is coupled to and disposed between an opposing pair of sizing brackets within the opposing guide rails. Each of the plurality of sizing rollers is coupled to a sizing bracket at a point outside of the area defined by the opposing vertical side walls.

In accordance with another embodiment of the invention, a potato seed sizing machine is disclosed comprising a frame having first and second substantially parallel, elongate, opposing primary guide rails. The first and second elongate opposing primary guide rails each comprise an elongate top guide rail substantially parallel with an elongate bottom guide rail. A plurality of sizing members disposed between the top guide rail and bottom guide rail are included, wherein each of the sizing members are oriented such that a direction of a load associated with the sizing member is substantially parallel with a longitudinal axis of the primary guide rails. In addition, a plurality of sizing brackets each extending below the lower guide rail are disclosed. Individual members of the plurality of sizing brackets are disposed between individual members of the plurality of sizing spring members. A portion of the individual members of the plurality of the sizing brackets within one primary guide rail is substantially collinear with a portion of individual members of the plurality of the sizing brackets within the opposing primary guide rail. A plurality of sizing rollers are disposed between and substantially perpendicular to the first and second primary guide rails. Each of the sizing rollers is rotatably coupled to and disposed between an opposing pair of sizing brackets. A centroid of each one of the plurality of sizing rollers is disposed beneath the lower guide rail.

In accordance with one embodiment of the present invention, a bracket for use in connection with food processing machines is disclosed comprising a main body having a planar plate with a bottom portion having substantially parallel first and second sides. A planar base plate is disposed substantially perpendicular to the main body and about front and back sides of the main body. A top stabilizing guide member is disposed on a top portion of the main body, wherein the top stabilizing guide member is substantially perpendicular to the main body and parallel to the planar base plate. A guide tube is disposed beneath and in contact with the base plate on a back side of the main body, wherein a longitudinal axis of the guide tube is oriented substantially parallel with a longitudinal axis of the top stabilizing guide member. A sizing member retention plate is disposed perpendicular to the main body between the top stabilizing guide member and the base plate and substantially parallel to the top stabilizing plate and the base plate.

BRIEF DESCRIPTION OF THE DRAWINGS

The present invention will become more fully apparent from the following description and appended claims, taken in conjunction with the accompanying drawings. Understanding that these drawings merely depict exemplary embodiments of the present invention they are, therefore, not to be considered limiting of its scope. It will be readily appreciated that the components of the present invention, as generally described and illustrated in the figures herein, could be arranged and designed in a wide variety of different configurations. Nonetheless, the invention will be described and explained with additional specificity and detail through the use of the accompanying drawings in which:

DETAILED DESCRIPTION OF EXEMPLARY EMBODIMENTS

Figure 1:
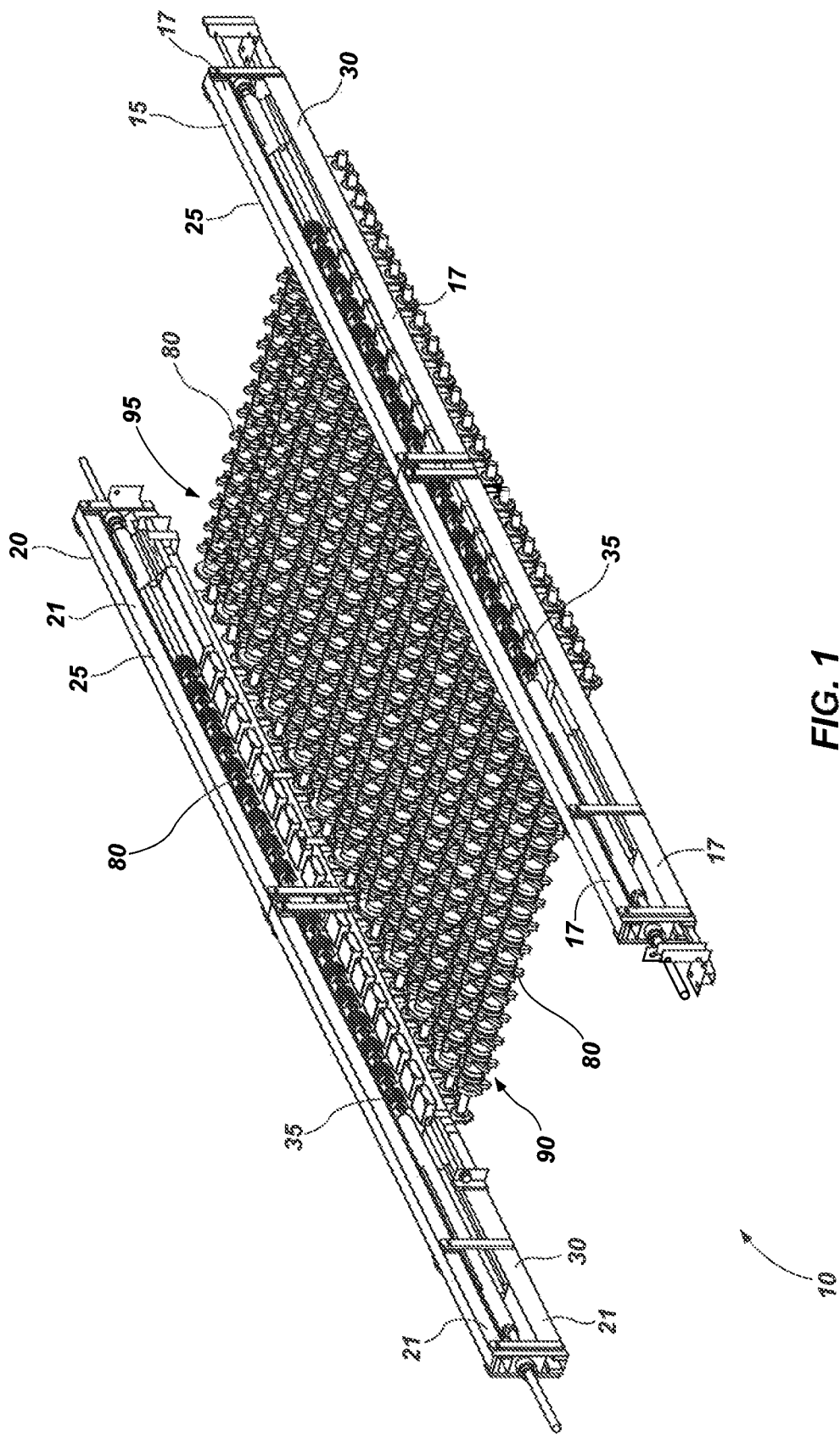
FIG. 1 is a perspective view of a sizing roller assembly in accordance with one embodiment of the invention.

The following detailed description of exemplary embodiments of the invention makes reference to the accompanying drawings, which form a part hereof and in which are shown, by way of illustration, exemplary embodiments in which the invention may be practiced. While these exemplary embodiments are described in sufficient detail to enable those skilled in the art to practice the invention, it should be understood that other embodiments may be realized and that various changes to the invention may be made without departing from the spirit and scope of the present invention. Thus, the following more detailed description of the embodiments of the present invention is not intended to limit the scope of the invention, as claimed, but is presented for purposes of illustration only and to describe the features and characteristics of the present invention, to set forth the mode of operation of the invention, and to sufficiently enable one skilled in the art to practice the invention. Accordingly, the scope of the present invention is to be defined solely by the appended claims.

The following detailed description and exemplary embodiments of the invention will be understood by reference to the accompanying drawings, wherein the elements and features of the invention are designated by numerals throughout.

In accordance with one embodiment of the invention, the present invention resides in a potato seed sizing device having an opposing pair of guide rails. A plurality of sizing brackets are disposed about the guide rails. A plurality of sizing rollers are disposed between a pair of opposing guide rails. Each of the sizing rollers is coupled to and disposed between an opposing pair of sizing brackets. Advantageously, each of the plurality of sizing rollers is detachable from the sizing brackets without adjustment of the guide rails or adjustment of the sizing brackets.

In accordance with another embodiment, the present invention resides in a potato seed sizing device and related components. It can be described as a frame having first and second elongate, opposing primary guide rails. The elongate opposing primary guide rails each comprise an elongate top guide rail disposed above an elongate bottom guide rail. A space is located beneath the top and bottom guide rails where a plurality of sizing spring members are located. Each of the spring members are oriented such that the direction of the spring force (i.e., the axial compression force of the spring) is substantially parallel with a longitudinal axis of the primary guide rails. Sizing brackets are located between each of the sizing spring members. The sizing brackets of one primary guide rail are aligned with sizing brackets within the opposing primary guide rail.

A plurality of sizing rollers is positioned between and substantially perpendicular to the opposing primary guide rails defining a row of rollers from a front end of the frame to a back end of the frame. Each of the sizing rollers is detachably coupled to and disposed between an opposing pair of aligned sizing brackets disposed in opposing guide rails. The sizing brackets are constructed and positioned so that the sizing rollers may be rotatably mounted to the seed sorting device and removed from the seed sorting device without adjustment to the sizing bracket or the guide rails. In one aspect of the invention, this is accomplished by constructing the sizing bracket such that the sizing roller couples to the sizing bracket outside the area between top and bottom guide rails. In this manner, construction of the seed sorting device and maintenance of the same are reduced.

The sizing rollers are coupled to a drive system that turns the rollers. As seed potatoes are placed at the front end of the device, the rotating action of the rollers moves the potatoes along the row of rollers. The rollers are separated into zones wherein each zone of rollers has different spaces between them. Commonly, the spaces between the rollers in the zones at the front of the row are smaller than the spaces in the zones towards the end of the row. In this manner, the smaller potatoes fall out first and larger potatoes are moved down the row and fall out into different zones. Potatoes in different zones are subject to different cutting regimes in order to produce a uniform seedling. For example, the smallest seed potatoes may not be cut all while the largest may be cut two or more times depending on the size of the potatoes.

The lateral space between the sizing rollers is determined by the width of the sizing brackets. Zones where sizing brackets have a larger width create a larger space between rollers. The relative size of the spring members and the amount of compression placed on each spring member also determines the size of the space between sizing rollers. In other words, when an axial load is placed on the spring members, the relative space between the rollers may be adjusted depending on the load applied on the spring members, size of the spring member, and the spring members' capacity to be compressed.

Figure 2:
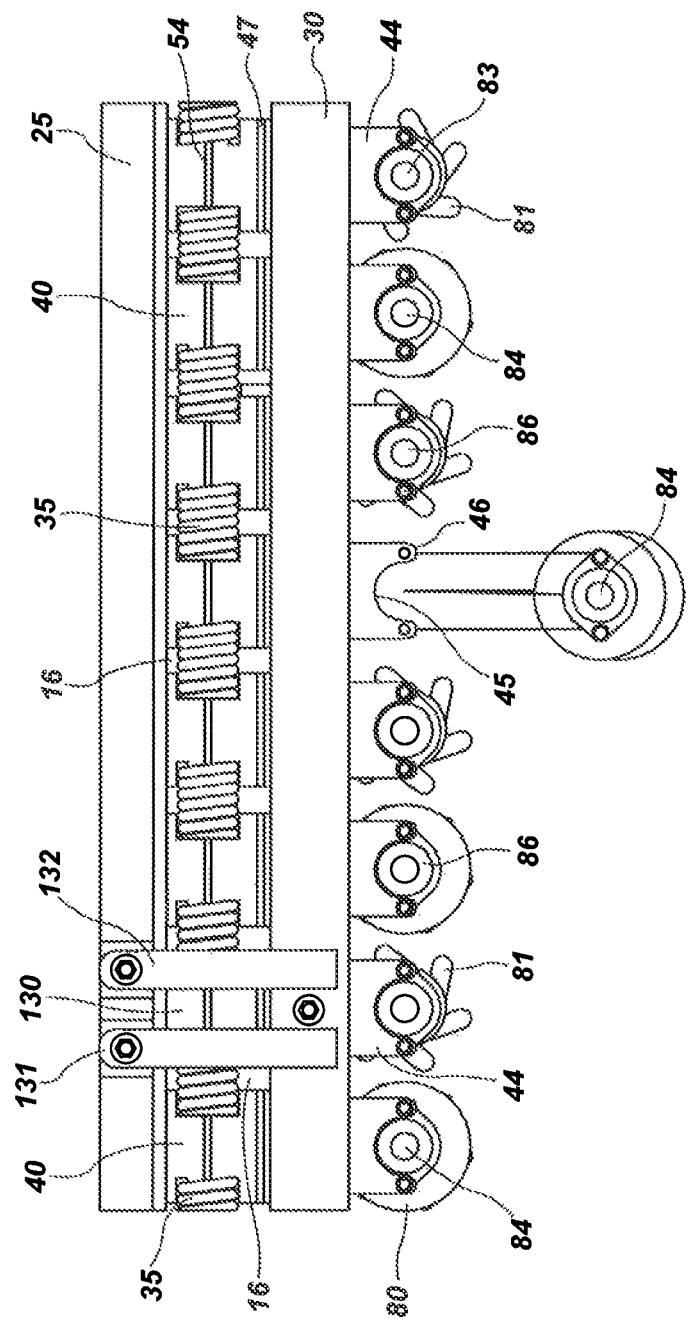
FIG. 2 is a side view of a portion of a sizing roller assembly in accordance with one embodiment of the invention.

With specific reference now to the figures, FIGS. 1 and 2 disclose a sizing roller assembly 10 for a seed potato cutter in accordance with one embodiment of the invention. A frame is illustrated having first 15 and second 20 elongate primary guide rails. The first 15 and second 20 primary guide rails are substantially parallel with one another and substantially coplanar. Each elongate primary guide rail comprises a top guide rail 25 substantially parallel and substantially coplanar with an elongate bottom guide rail 30. The guide rails 15 and 20 each have space 16 between the top 25 and bottom 30 guide rails. That area is defined by a vertical plane associated with front and back vertical side walls 17, 21 of each guide rail. As the top 25 and bottom 30 guide rails are substantially parallel and coplanar, the vertical planes associated with font and back vertical sides walls of top 25 and bottom 30 guide rails are also substantially coplanar. The area 16 between the vertical planes of the vertical side walls is further defined by a bottom 18 of the top guide rail 25 and a top 32 of the bottom guide rail 30. In one aspect of the invention, the top and bottom guide rails 25, 30 have a hollow, internal portion defined by the outer walls of the top 25 and bottom 30 guide rails.

While specific reference is made herein to a sizing roller assembly for cutting potato seeds, it is understood and contemplated herein that the machine could be used in connection with the sorting and cutting of any product capable of being sorted and cut by the machine or any process that would benefit from the invention disclosed herein.

The machine further comprises a plurality of spring sizing members 35 disposed in the space 16 between the top guide rail 25 and bottom guide rail 30. As noted above, that space is defined by the vertical planes of vertical side walls 17, 21 as well as walls 18 and 32. While a coil spring 35 is shown in the attached figures, it is understood that any number of spring devices are contemplated for use herein so long as the device has spring-like characteristics. For example, in one aspect of the invention, the spring sizing members comprise a helical spring, a plate spring, a pneumatic piston, a hydraulic piston, or a compressible rubber element. Each of the above-referenced examples is capable of being compressed under a load and resiliently returning to its original state once the load is removed. While compressed, the spring sizing member 35 exerts an axial force in the direction opposite of the direction of compression of the spring sizing member 35. Each of the sizing members 35 are oriented such that a direction of the load exerted on the spring sizing member 35 or the related response load exerted by the spring sizing member is substantially parallel with a longitudinal axis of the primary guide rails 15, 20. While reference is made herein to a spring sizing member, other sizing members are contemplated for use herein. For example, in another aspect of the invention, sizing members are not springs but are mechanical-actuated sizing devices such as articulating arms, tie-rod assemblies, or other mechanical means known in the art suitable for controlling the distance between sizing brackets.

A plurality of sizing brackets 40 is disposed between individual members of the plurality of sizing spring members 35 at least partially in the area defined by front and back vertical side walls 17, 21. In accordance with one aspect of the invention, the sizing brackets 40 are positioned within the space 16 between the top 25 and bottom 30 guide rails of the primary guide rails 15, 20. The sizing brackets 40 are slidably coupled to the guide rails to minimize pitching or rolling of the brackets during operation of the machine while allowing movement in a lateral direction which is one function of the sizing brackets. The sizing brackets 40 are configured such that a sizing roller is attached to the bracket at a point outside of the area 16 between top and bottom guide rails. In accordance with one aspect of the invention, the sizing brackets 40 and guide rails 20 are made from a rigid material such as iron, steel, or another metal alloy as is known in the art. In another embodiment, the brackets 40 and guide rails 20 are formed from a polymeric material or made from a combination of different materials as suits a particular purpose. The brackets 40 and guide rails 20 may be stamped, cut, extruded, cast, bent, or formed in any manner known in the art. Different components of the sizing brackets and guide rails may be formed from one or more sub components and may be welded, bonded, or otherwise joined as is known in the art.

Figure 3:
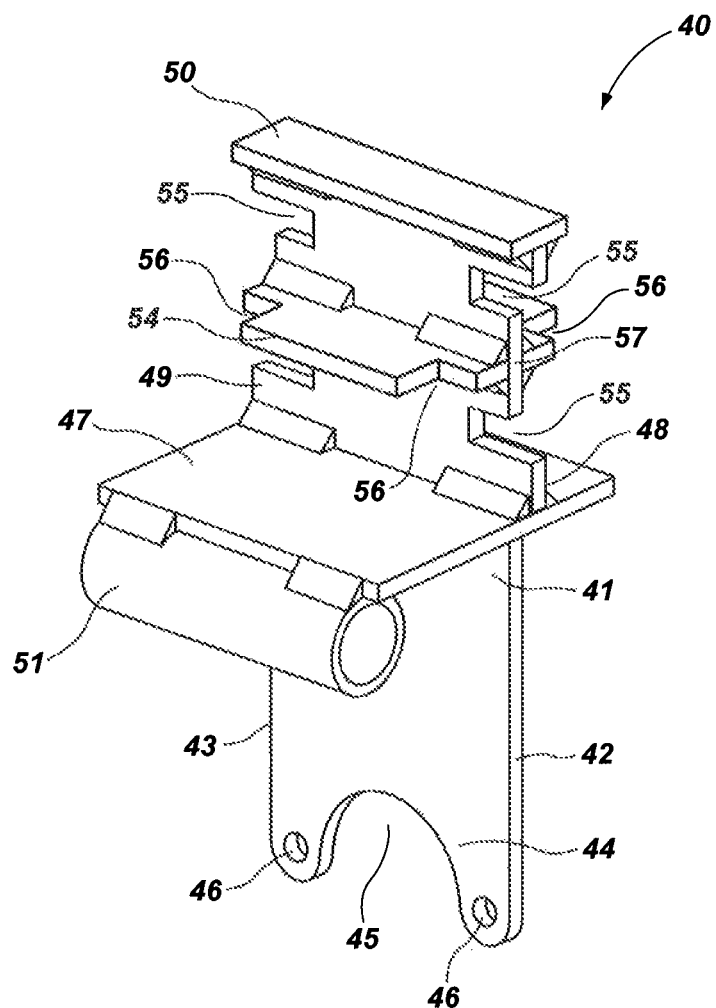
FIG. 3 is a perspective view of a sizing bracket in accordance with one embodiment of the present invention.
Figure 4:
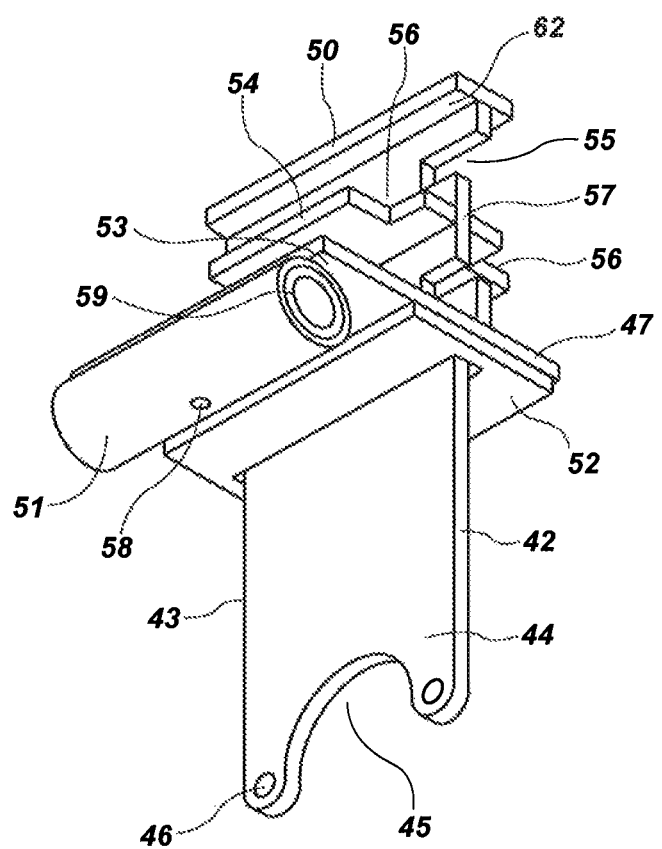
FIG. 4 is a perspective view of a sizing bracket in accordance with one embodiment of the invention.
Figure 5:
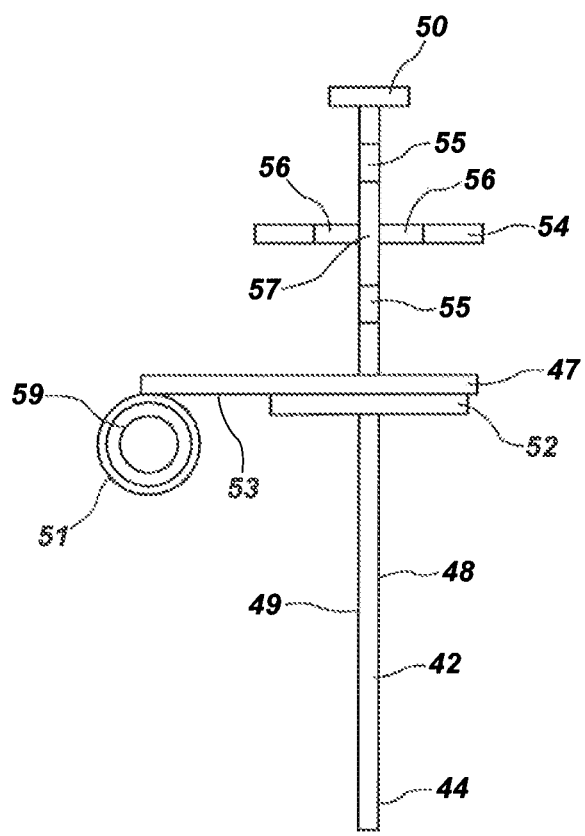
FIG. 5 is a side view of a sizing bracket in accordance with one embodiment of the present invention.

Referring additionally to FIGS. 3-5, in accordance with one embodiment of the invention, each bracket 40 comprises a main body 41 having a planar plate. The main body has substantially parallel first and second sides 42, 43. The extreme bottom 44 of the main body 41 comprises a semi-circular recess 45 with apertures 46 on opposing sides of the recess 45. While a downward facing semi-circular recess 45 is shown, other shaped recesses (e.g., rectangular, triangular, etc.) or combinations of recesses and apertures are contemplated for use herein so long as the bottom 44 of the main body 41 is capable of rotatably securing an end portion of a sizing roller therein. In one embodiment of the invention, the main body 41 is disposed within an aperture that extends downward from a top 32 of the bottom rail 30 to a bottom 33 of the bottom rail such that the bottom 44 of the sizing bracket 40 extends below the bottom 33 of the bottom rail 30. In this manner, the bottom of the bracket 40 is stabilized between the opposing sides of the bottom rail 30. In another embodiment of the invention, the main body 41 is disposed about an outside of the bottom guide rail 30 (either on a front or back side of the guide rail 30) and also extends below the bottom 33 of the bottom rail 30.

However, it is not necessary in all embodiments that the bracket 40 extend below the bottom 33 of the bottom guide rail 30. For example, in another embodiment of the invention, the bottom 44 of the sizing bracket 40 is disposed below a top surface 32 of the bottom guide rail 30 but terminates above a bottom surface 33 of the bottom guide rail 30 yet is capable of detachably receiving a sizing roller therein. In this aspect, the bottom 44 of the sizing bracket is disposed about a back side (i.e., the side facing the opposing guide rail) of the bottom guide rail 30.

In still another embodiment, the sizing bracket does not extend below a top surface 32 of the bottom guide rail 30. Rather, a bracket component intended to receive the sizing roller extends laterally towards an opposing guide rail and includes an attachment member with an upward facing recess. In this manner, sizing rollers are lifted up out of the sizing bracket rather than being removed downward from a bottom of the bracket. In one aspect, the bracket component is placed on the base plate 47 above the guide tube 51 and has an upward facing recess.

A planar base plate 47 is disposed substantially perpendicular to the main body 41 and about front 48 and back sides 49 of the main body 41. A top stabilizing guide member 50 is disposed on a top portion of the main body 41. The top stabilizing guide member 50 (or plate) is substantially perpendicular to the main body 41 and parallel to the planar base plate 47. The stabilizing guide member is configured to be placed within a hollow portion of the top guide rail 25. An aperture in the bottom of the top guide rail 25 substantially similar in width as the main body 41 is provided. The bottom 62 of the stabilizing member 50 rests on a top surface 27 of the bottom of the top guide rail 25. In this manner, the stabilizing member 50 is slidably coupled with the top guide rail 25. While reference to a plate has been made herein with respect to the top stabilizing guide member 50, other shaped guide members are contemplated for use herein so long as a top portion of the sizing bracket 40 is coupled to the top guide rail 25. For example, in another embodiment of the invention, a top stabilizing guide member comprises a cylinder or a tube configured to be disposed within a hollow portion 26 of the top guide rail 25. In another embodiment, the top stabilizing guide member comprises a plurality of teeth or hooks configured to be disposed within a hollow portion 26 of the top guide rail 25 or to otherwise be secured to the top guide rail 25. In an additional embodiment, the top stabilizing guide member comprises a hook or clamp intended to be secured about an outside portion of the top guide rail 25.

Figure 11:
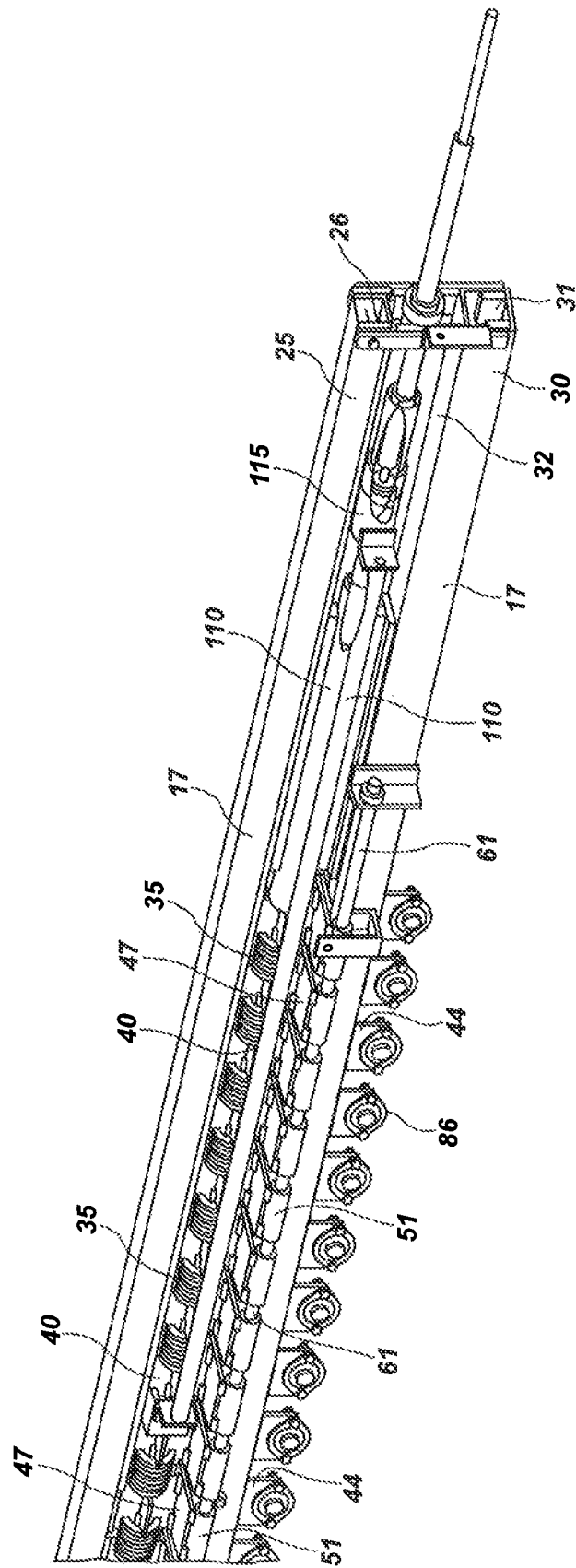
FIG. 11 is a perspective rear view of a portion of a rail guide in accordance with one embodiment of the present invention.

A hollow guide tube 51 is disposed beneath and in contact with the base plate 47 on a back side 49 of the main body 41. A longitudinal axis of the guide tube 51 is oriented substantially parallel with a longitudinal axis of the top of the main body 41. In this manner, a stabilizing rod 61 mounted to the bottom guide rail 30 is disposed through concentric guide tubes 51 of the sizing brackets 40 across the entire guide rail 20 (see, e.g., FIG. 11). The stabilizing rod 61 minimizes bracket pitch and roll during operation. However, it is not necessary that a single stabilizing rod 61 be used across the entire guide rail. In one aspect of the invention, numerous stabilizing rods are used in connection with different groups of sizing brackets. In another embodiment of the invention, the guide tube 51 is disposed on a top portion of the base plate 47, rather than on the bottom. While reference is made herein to a hollow guide tube 51, it is understood that other means of securing the stabilizing rod 61 are contemplated for use herein. For example, in yet another embodiment of the present invention, a clamp, ring, or other securement device is coupled to the sizing bracket 40 in order to receive the stabilizing rod 61 therein.

In one aspect of the invention, a dampening member 52, such as rubber, nylon, or some other resilient material, is disposed beneath the base plate 47 to absorb vibration between a top 32 of the lower guide rail 33 and a bottom 53 of base plate 47. Moreover, an aperture 58 or grease zerk is present within the guide tube 51 to permit lubrication of the guide tube. A plastic or nylon or rubber ring 59 is disposed within the guide tube 51 to facilitate placement of the stabilizing rod 61 therein.

In accordance with one embodiment of the invention, spring retention plate 54 (or sizing member retention device) is disposed perpendicular to the main body 40 between the top stabilizing guide plate 50 and the base plate 47. The spring retention plate 54 is substantially parallel to the top stabilizing plate 50 and the base plate 47. Opposing sides of the main body 41 comprise a pair of recesses 55 configured to receive opposing sides of the spring member therein. Opposing sides of the spring retention plate 54 also comprise a pair of recesses 56 configured to receive opposing sides of the spring member therein. In this manner, when using a coil spring, the walls of the spring are disposed within the recesses formed in the spring retention plate 54 and the main body 41 of the sizing bracket 35. An area 57 where the main body 41 and spring retention plate 54 connect is disposed within the hollow inside of the spring. As numerous sizing members are contemplated for use herein, other embodiments of the invention contemplate other configurations for the sizing bracket 35 in order to couple the sizing bracket with the sizing member. For example, in one embodiment of the invention, the sizing bracket comprises at least one recess disposed about the first side of the bracket and at least one recess disposed about the second side of the bracket, each recess being configured to receive a portion of a sizing member therein. As noted above, other configurations are contemplated for use herein, so long as the sizing bracket 40 is operatively coupled to the sizing member 35.

Figure 6:
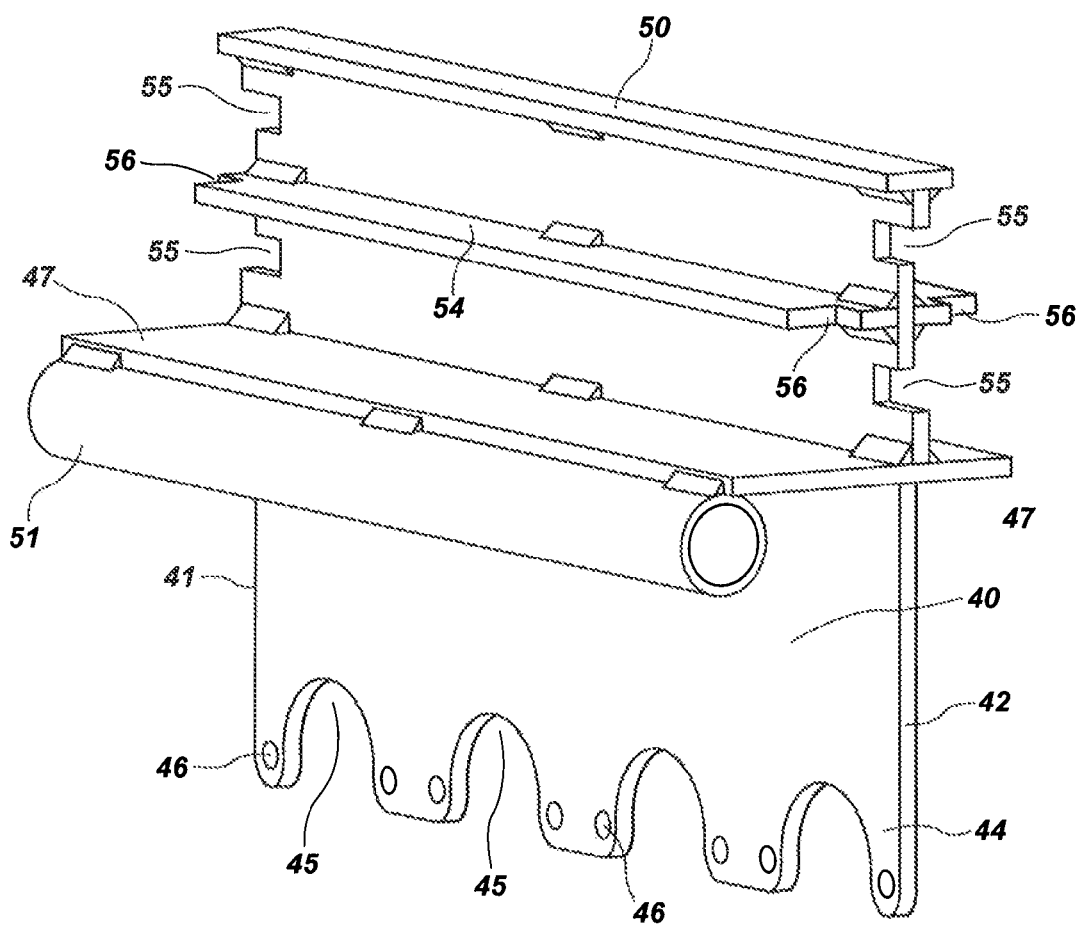
FIG. 6 is a perspective view of a sizing bracket in accordance with one embodiment of the present invention.

Referring specifically to FIG. 6, a sizing bracket 70 is disclosed. The sizing bracket 70 comprises features that are similar to those illustrated in FIGS. 3-5 except that it is longer than the sizing brackets 35 and contains four recesses 45 within the bottom of 44 the main body 40 and associated apertures 46 for the coupling of multiple sizing rollers to a single sizing bracket 70. This bracket is used in any part of the seed sorting process where a change in the space between sizing rollers is not desired, for example, towards the end of a row of sizing rollers. Other reference numbers used in connection with sizing bracket 35 are used in connection with sizing bracket 70 and have similar meanings.

Referring now generally to FIGS. 1 and 7 through 9, in accordance with one embodiment of the invention, a plurality of sizing rollers 80 is disposed between the opposing guide rails 15, 20. The sizing rollers 80 are substantially perpendicular to the opposing guide rails 15, 20 and are rotatably coupled to and disposed between an opposing pair of sizing brackets. In accordance with one embodiment of the invention, each one of the plurality of sizing rollers 80 is coupled to a bottom portion 44 of the sizing bracket 35 about the longitudinal axis 84 of the roller. In one embodiment, the bottom of the sizing bracket is disposed beneath a top surface 32 of the lower guide rail. In yet another embodiment, the bottom 44 of the sizing bracket 35 is disposed beneath a bottom surface 33 of the lower guide rail 30. In this manner, the sizing rollers 80 may be detachably coupled to the bottom 44 of the sizing brackets 35 and easily removed for maintenance of the same.

The sizing rollers 80 comprise a generally cylindrical member with a plurality of finger elements 81 disposed about a perimeter of the roller 80. In accordance with one embodiment of the invention, a group of finger elements are disposed within an annular space about the roller. Groups of finger elements (sometimes referred to as finger stars) are disposed about the longitudinal axis of the rollers with a space 82 between each group of finger elements 81. Rollers 80 are disposed side-by-side in such a manner that a group of finger elements on one roller 80 is adjacent the space between a group of finger elements on an adjacent roller. The sizing rollers 80 are made of a solid rigid center rod 83 comprising a metal alloy or other rigid material. An outer layer of a pliable, resilient material such as rubber is disposed about the center rod 83 to form the finger elements 81 and remaining outer surface of the sizing roller 80. The center rod 83 of sizing roller 80 couples with the recess 45 of the sizing bracket. In one aspect of the invention, a ball bearing assembly 86 is mounted within recess 45 by way of a conventional bolt assembly through apertures 46. The ball-bearing assembly 86 comprises a hollow center configured to receive the center rod 83 therethrough. Other sizes and shapes of sizing rollers are contemplated for use herein to accomplish the function of sorting seed potatoes.

Figure 7:
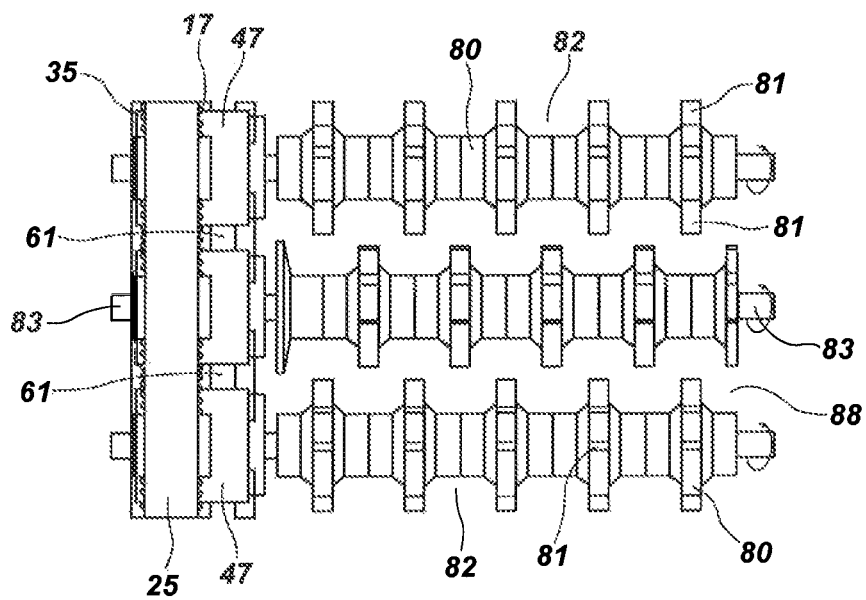
FIG. 7 is a top view of a portion of a sizing roller assembly in accordance with one embodiment of the present invention.
Figure 8:
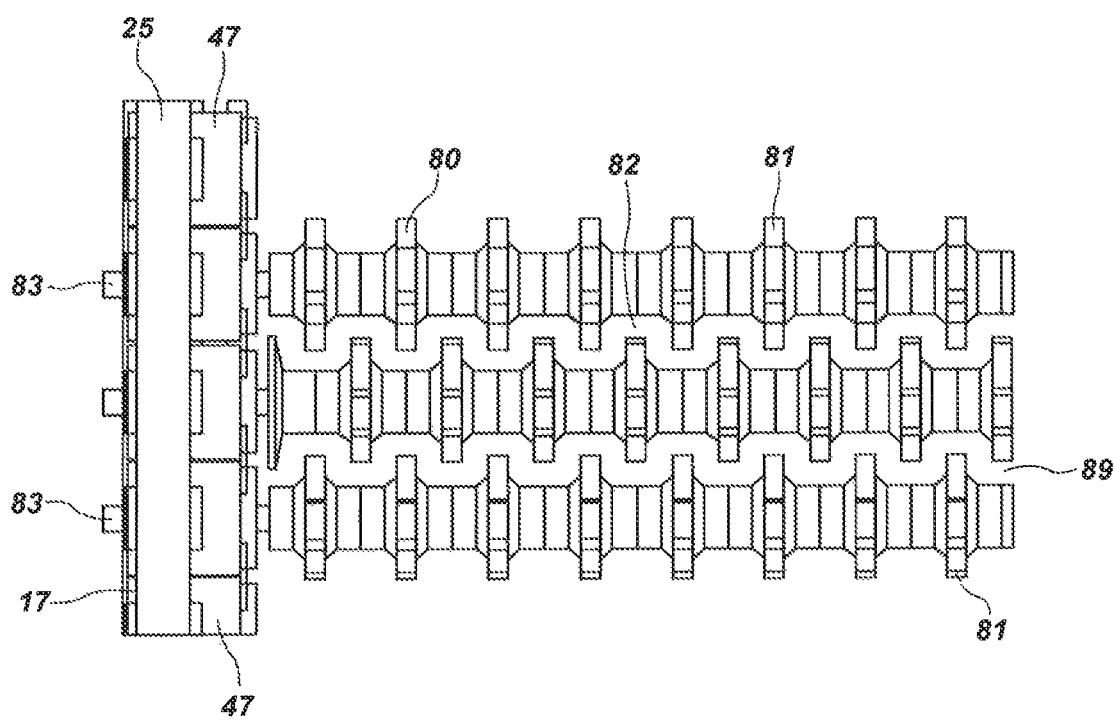
FIG. 8 is a top view of a portion of a sizing roller assembly in accordance with one embodiment of the present invention.
Figure 9:
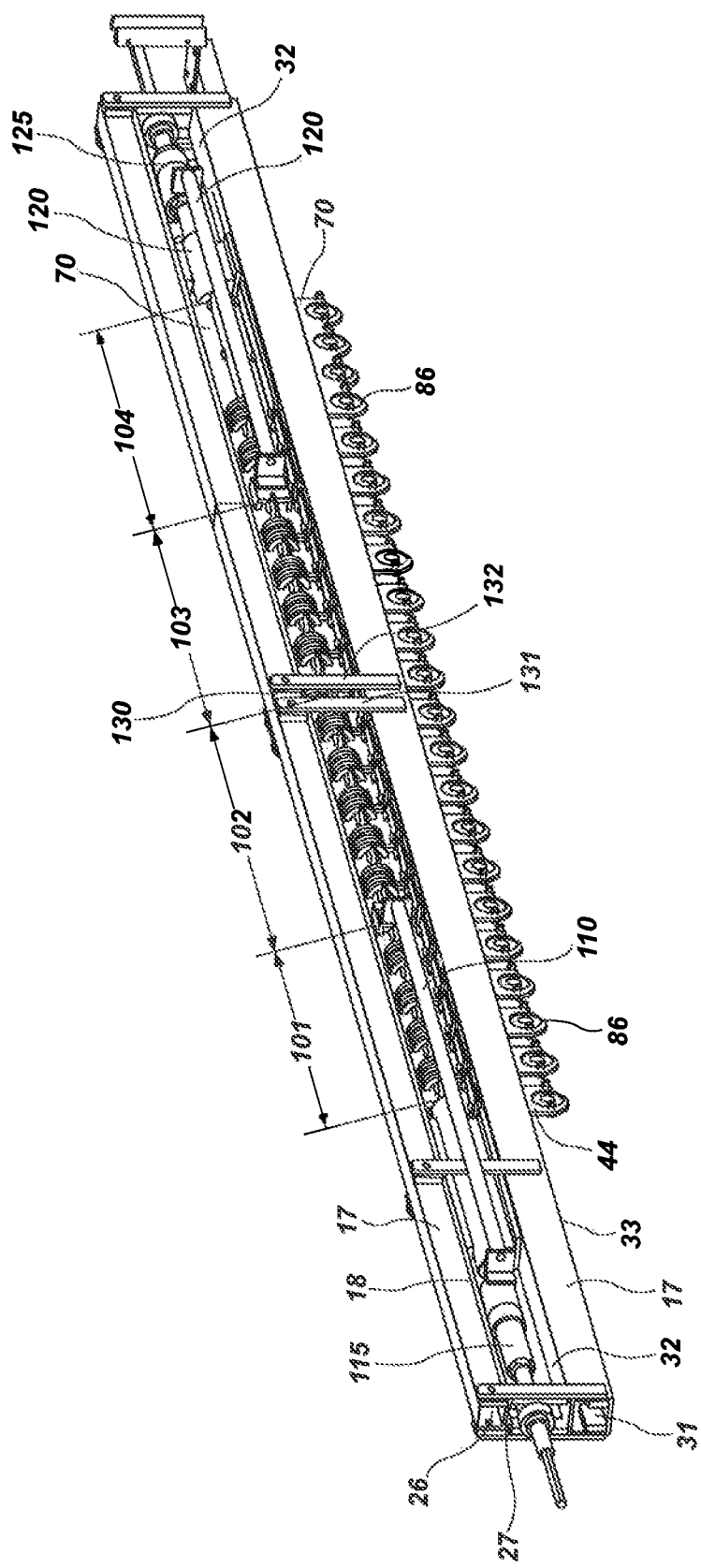
FIG. 9 is a perspective front view of a rail guide in accordance with one embodiment of the present invention.
Figure 10:
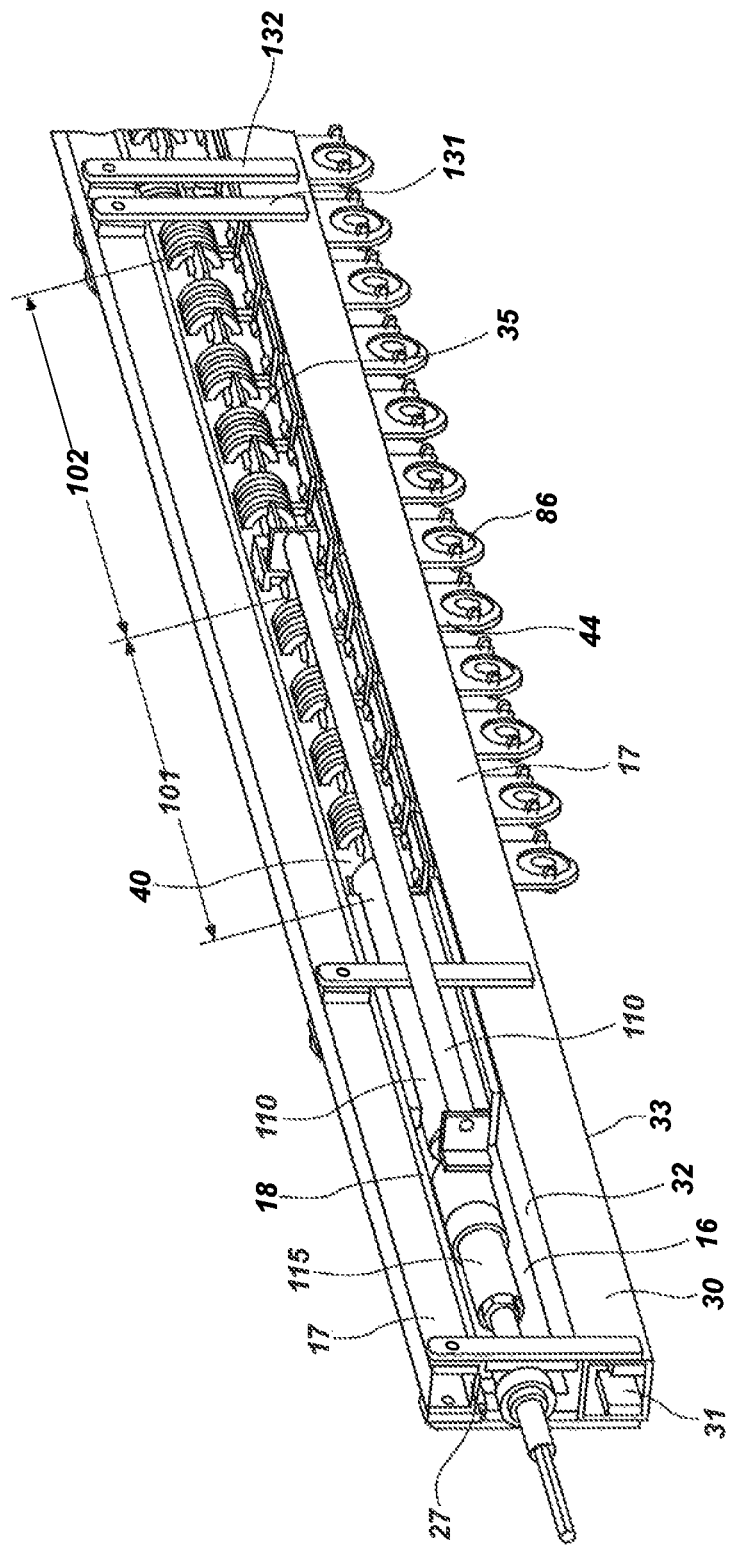
FIG. 10 is a perspective front view of a portion of a rail guide in accordance with one embodiment of the present invention.

With reference generally to FIGS. 7 through 11, in accordance with one embodiment of the invention the sizing rollers are coupled to a drive system that turns the rollers. As seed potatoes are placed at the front end 90 of the device 10 the rotating action of the rollers 80 moves the potatoes along the row of rollers towards the back end 95 of the device. In one aspect of the invention, the rollers 80 are separated into four zones 101, 102, 103, 104 wherein each zone of rollers has different sized spaces between them. Commonly, the spaces between the rollers in the zones at the front of the row are smaller than the spaces in the zones towards the end of the row. In this manner, the smaller potatoes fall out first and larger potatoes are moved down the row and fall out into different zones. In accordance with one embodiment of the present invention, the space between the sizing rollers 80 is determined by the width of the sizing brackets 40. Zones where sizing brackets have a larger width create a larger space between rollers. The relative size of the spring members 35 and the amount of compression placed on each spring member 35 also determines the space between sizing rollers 80. When an axial load is placed on the spring members 35, the relative space between the rollers 80 may be adjusted depending on the load applied on the spring members 35 and the spring members' capacity to be compressed. For example, in one embodiment of the present invention FIG. 7 illustrates an "open" position where no compression force is placed on the spring members 35 and FIG. 8 illustrates a "closed" position where a compression force is applied to the spring members 35. The "open" position illustrates a maximum distance 88 between sizing rollers whereas the "closed" position illustrates a minimum distance 89 between sizing rollers. It is understood and contemplated herein that the distance between the sizing rollers may reside anywhere between those two points.

Alternating sizing brackets 40 and sizing members 35 are disposed between the top and bottom guide rails 25 and 30. The distance between sizing brackets may be adjusted by compressing the sizing members. A drive piston 110 is disposed between the top and bottom guide rails. The drive piston 110 is positioned to and capable of applying an axial load to the alternating sizing brackets 40 and sizing members 35 and compressing the sizing members 35. In one aspect of the invention, multiple drive pistons 110 are used to compress different zones. A primary drive piston 115 is coupled to a pair of drive pistons 110 to compress zones 101 and 102, for example. On an opposing side of the guide rail, a primary drive piston 125 is coupled to a pair of drive pistons 120 to compress zones 103 and 104. The direction of the compression of primary drive piston 125 is opposite the direction of compression from drive piston 115. A dead zone 130 is located between zones 102 and 103 where no force is transferred from one zone to another zone due in part to central bracket 130 located between end members 131 and 132.

Primary drive pistons 115, 125 may be hydraulic pistons or other-powered pistons as is known in the art. While specific reference is made herein to drive pistons, it is understood and contemplated herein that other drive mechanisms are contemplated for use herein so long as an appropriate force is placed axially upon the sizing bracket sizing member assembly. In accordance with one aspect of the invention, primary drive pistons on opposing guide rails are operatively linked together. In this manner, any movement by one drive piston is complemented by the drive piston on an opposing guide rail in order to ensure that when a sizing bracket on one guide rail is laterally adjusted, its corresponding sizing bracket in an opposing guide rail is also laterally adjusted.

The foregoing detailed description describes the invention with reference to specific exemplary embodiments. However, it will be appreciated that various modifications and changes can be made without departing from the scope of the present invention as set forth in the appended claims. The detailed description and accompanying drawings are to be regarded as merely illustrative, rather than as restrictive, and all such modifications or changes, if any, are intended to fall within the scope of the present invention as described and set forth herein.

More specifically, while illustrative exemplary embodiments of the invention have been described herein, the present invention is not limited to these embodiments, but includes any and all embodiments having modifications, omissions, combinations (e.g., of aspects across various embodiments), adaptations and/or alterations as would be appreciated by those in the art based on the foregoing detailed description. The limitations in the claims are to be interpreted broadly based on the language employed in the claims and not limited to examples described in the foregoing detailed description or during the prosecution of the application, which examples are to be construed as non-exclusive. For example, in the present disclosure, the term "preferably" is non-exclusive where it is intended to mean "preferably, but not limited to." Any steps recited in any method or process claims may be executed in any order and are not limited to the order presented in the claims. Means-plus-function or step-plus-function limitations will only be employed where for a specific claim limitation all of the following conditions are present in that limitation: a) "means for" or "step for" is expressly recited; and b) a corresponding function is expressly recited. The structure, material or acts that support the means-plus-function are expressly recited in the description herein. Accordingly, the scope of the invention should be determined solely by the appended claims and their legal equivalents, rather than by the descriptions and examples given above.

The invention claimed is:

1. A potato seed sizing machine, comprising:
   a pair of laterally spaced opposing guide rails, wherein each guide rail comprises a top member and a bottom member and an area between the top and bottom member;
   a plurality of sizing brackets disposed about the opposing guide rails;
   a plurality of sizing rollers disposed in the lateral space between the opposing guide rails, wherein each of the sizing rollers is coupled to and disposed between an opposing pair of sizing brackets within the opposing guide rails; and
   wherein each of the plurality of sizing rollers is coupled to a sizing bracket at a point outside of the area between the top and bottom members; and wherein a bottom of the sizing bracket extends below a bottom portion of the guide rail.

2. The seed sizing machine of claim 1, wherein the bottom of the sizing bracket extends through an aperture extending from a top of the bottom guide rail down through a bottom of the bottom guide rail.

3. The seed sizing machine of claim 1, wherein the sizing bracket comprises a hollow guide tube having a longitudinal axis substantially parallel to the top guide rail.

4. The seed sizing machine of claim 3, wherein the opposing guide rails each comprise a stabilizer rod disposed through the hollow guide tube of the sizing brackets.

5. A potato seed sizing machine, comprising:
   a pair of laterally spaced opposing guide rails, wherein each guide rail comprises a top member and a bottom member and an area between the top and bottom member;
   a plurality of sizing brackets disposed about the opposing guide rails; and
   a plurality of sizing rollers disposed in the lateral space between the opposing guide rails, wherein each of the sizing rollers is coupled to and disposed between an opposing pair of sizing brackets within the opposing guide rails;
   wherein each of the plurality of sizing rollers is coupled to a sizing bracket at a point outside of the area between the top and bottom members;
   wherein the sizing bracket comprises:
      (i) a main body comprising a plate having a bottom portion with substantially parallel first and second sides;
      (ii) a base plate disposed substantially perpendicular to the main body, a top stabilizing guide member disposed on a top portion of the main body and substantially perpendicular to the main body;
      (iii) a guide tube disposed about the base plate, wherein a longitudinal axis of the guide tube is oriented substantially parallel with the top stabilizing guide member; and
      (iv) a sizing member retention plate disposed perpendicular to the main body between the top stabilizing guide member and the base plate.

6. The seed sizing machine of claim 5, wherein opposing sides of the main body comprise a pair of recesses configured to receive opposing sides of a spring member therein and wherein opposing sides of a sizing retention plate comprise a pair of recesses configured to receive opposing sides of the spring member therein.

7. The seed sizing machine of claim 5, wherein a bottom of the base plate is disposed on top of a top surface of the lower guide rail.

8. The seed sizing machine of claim 5, wherein the top stabilizing guide member is slidably disposed in a void within the top guide rail.

9. A potato seed sizing machine, comprising:
   a pair of laterally spaced opposing guide rails, wherein each guide rail comprises a top member and a bottom member and an area between the top and bottom member;
   a plurality of sizing brackets disposed about the opposing guide rails;
   a plurality of sizing rollers disposed in the lateral space between the opposing guide rails, wherein each of the sizing rollers is coupled to and disposed between an opposing pair of sizing brackets within the opposing guide rails; and
   wherein each of the plurality of sizing rollers is coupled to a sizing bracket at a point outside of the area between the top and bottom members; and
   wherein each of the opposing guide rails comprise:
      (i) an elongate top guide rail disposed above an elongate bottom guide rail defining a space between a bottom of the top guide rail and a top of the bottom guide rail; and
      (ii) a plurality of sizing members disposed between the top guide rail and bottom guide rail, wherein each of the sizing members are oriented such that a direction of the force exerted by the sizing member is substantially parallel with a longitudinal axis of primary guide rails, wherein individual members of the plurality of sizing brackets are disposed between individual members of the plurality of sizing members.

10. The seed sizing machine of claim 9, wherein a bottom of the sizing bracket extends below a bottom portion of the bottom guide rail.

11. The seed sizing machine of claim 10, wherein the bottom of the sizing bracket extends through an aperture extending from a top of the bottom guide rail down through a bottom of the bottom guide rail.

12. The seed sizing machine of claim 9, wherein the sizing bracket comprises a hollow guide tube having a longitudinal axis substantially parallel to the top guide rail.

13. The seed sizing machine of claim 12, wherein the opposing guide rails each comprise a stabilizer rod disposed through the hollow guide tube of the sizing brackets.

* * * * *